United States Patent [19]

Motoe et al.

[11] Patent Number: 4,941,046

[45] Date of Patent: Jul. 10, 1990

[54] SIGNAL PROCESSING CIRCUIT FOR A MOVING DETECTION CIRCUIT WHICH INCLUDES COEFFICIENT GENERATOR WHEREIN A NUMBER OF DELAY DEVICES ARE CONNECTED IN SERIES WITH THE FIRST ONE RECEIVING THE OUTPUT OF A MOVING DETECTION CIRCUIT AND INCLUDING A TIME BASE FILTER

[75] Inventors: Hisafumi Motoe; Hiroyuki Kawashima, both of Tokyo; Masaharu Tokuhara, Kanagawa, all of Japan

[73] Assignee: Sony Corporation, Tokyo, Japan

[21] Appl. No.: 379,055

[22] Filed: Jul. 13, 1989

[30] Foreign Application Priority Data

| Jul. 22, 1988 | [JP] | Japan | 63-183205 |
| Jul. 25, 1988 | [JP] | Japan | 63-185169 |
| Jul. 25, 1988 | [JP] | Japan | 63-185268 |
| Jul. 27, 1988 | [JP] | Japan | 63-187295 |

[51] Int. Cl.$^5$ .......................................... H04N 5/217
[52] U.S. Cl. .................................. 358/167; 358/105; 358/36
[58] Field of Search .............. 358/105, 166, 167, 160, 358/31, 36, 37, 140

[56] References Cited

U.S. PATENT DOCUMENTS

| 4,352,126 | 7/1982 | Poncin et al. | 358/167 |
| 4,500,911 | 2/1985 | Ninomiya et al. | 358/167 X |
| 4,618,882 | 10/1986 | Harwood et al. | 358/105 X |
| 4,667,233 | 5/1987 | Furukawa | 358/136 |
| 4,679,086 | 7/2987 | May | 358/105 X |
| 4,684,989 | 8/1987 | Roeder et al. | 358/167 |
| 4,733,297 | 3/1988 | Katsumata et al. | 358/105 |
| 4,737,850 | 4/1988 | Lu et al. | 358/167 |

Primary Examiner—James J. Groody
Assistant Examiner—Victor R. Kostak
Attorney, Agent, or Firm—Hill, Van Santen, Steadman & Simpson

[57] ABSTRACT

A signal processing circuit for a moving detection circuit which has a coefficient generator which is connected to an output of a moving detection circuit. A level comparator is connected between the moving detection circuit and the coefficient generator and is also connected to a threshold voltage switch. An isolated-point eliminating circuit is connected between the level comparator and a time base filter which is connected at its output terminal to the input terminal of the coefficient generator. The coefficient generator includes a plurality of one bit delay devices which are connected in series and the plurality of one bit delay devices have a plurality of output terminals, and an adder is connected to the plurality of output terminals so as to add the output signals.

11 Claims, 8 Drawing Sheets

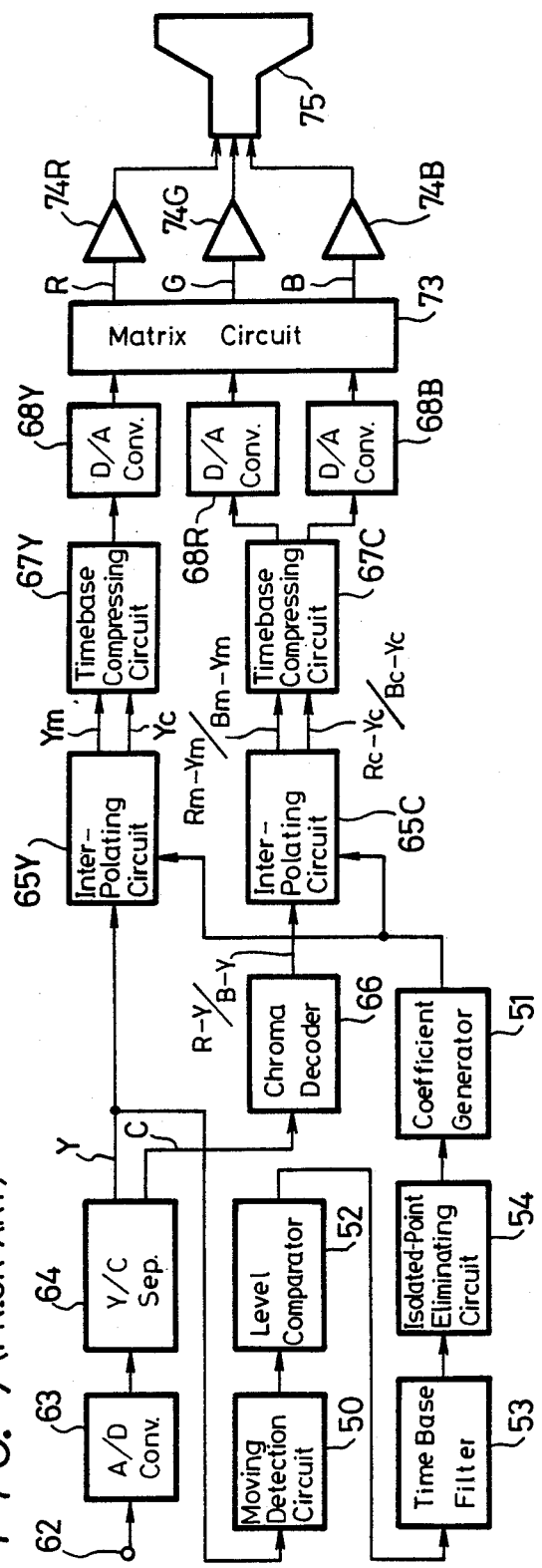
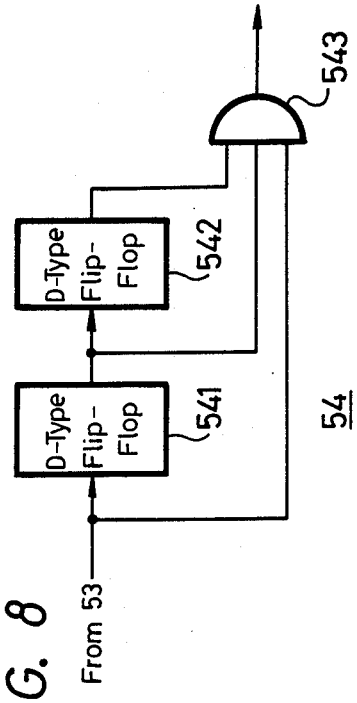
FIG. 7 (PRIOR ART)
FIG. 8

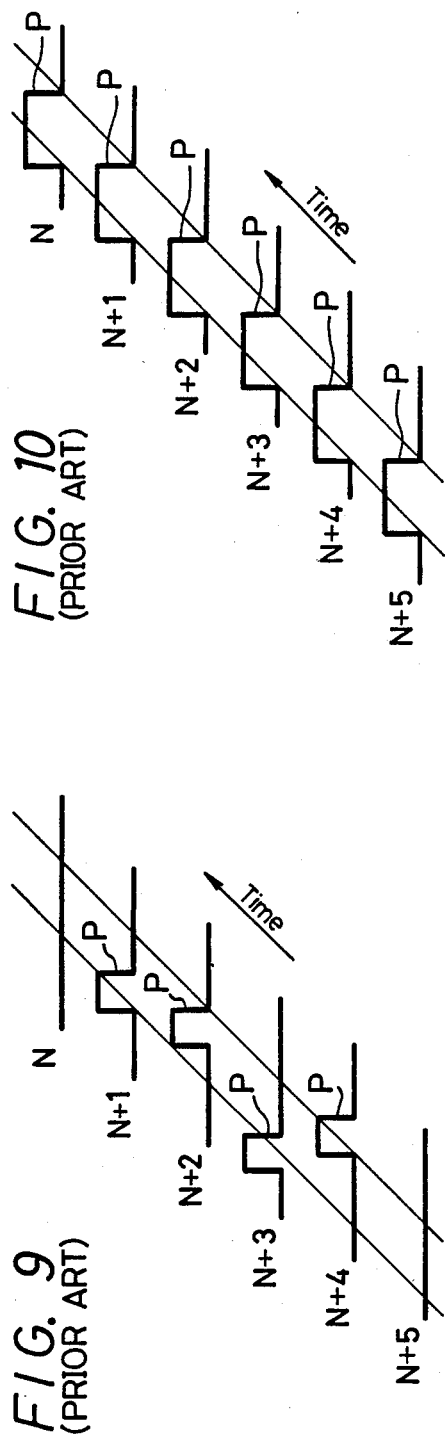
FIG. 10 (PRIOR ART)
FIG. 9 (PRIOR ART)
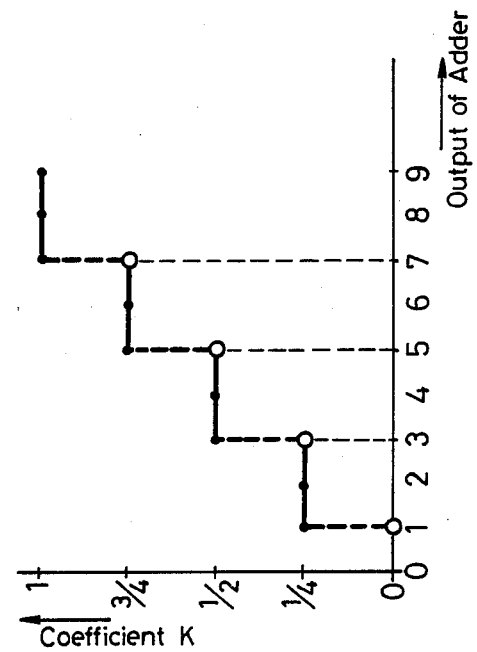
FIG. 13

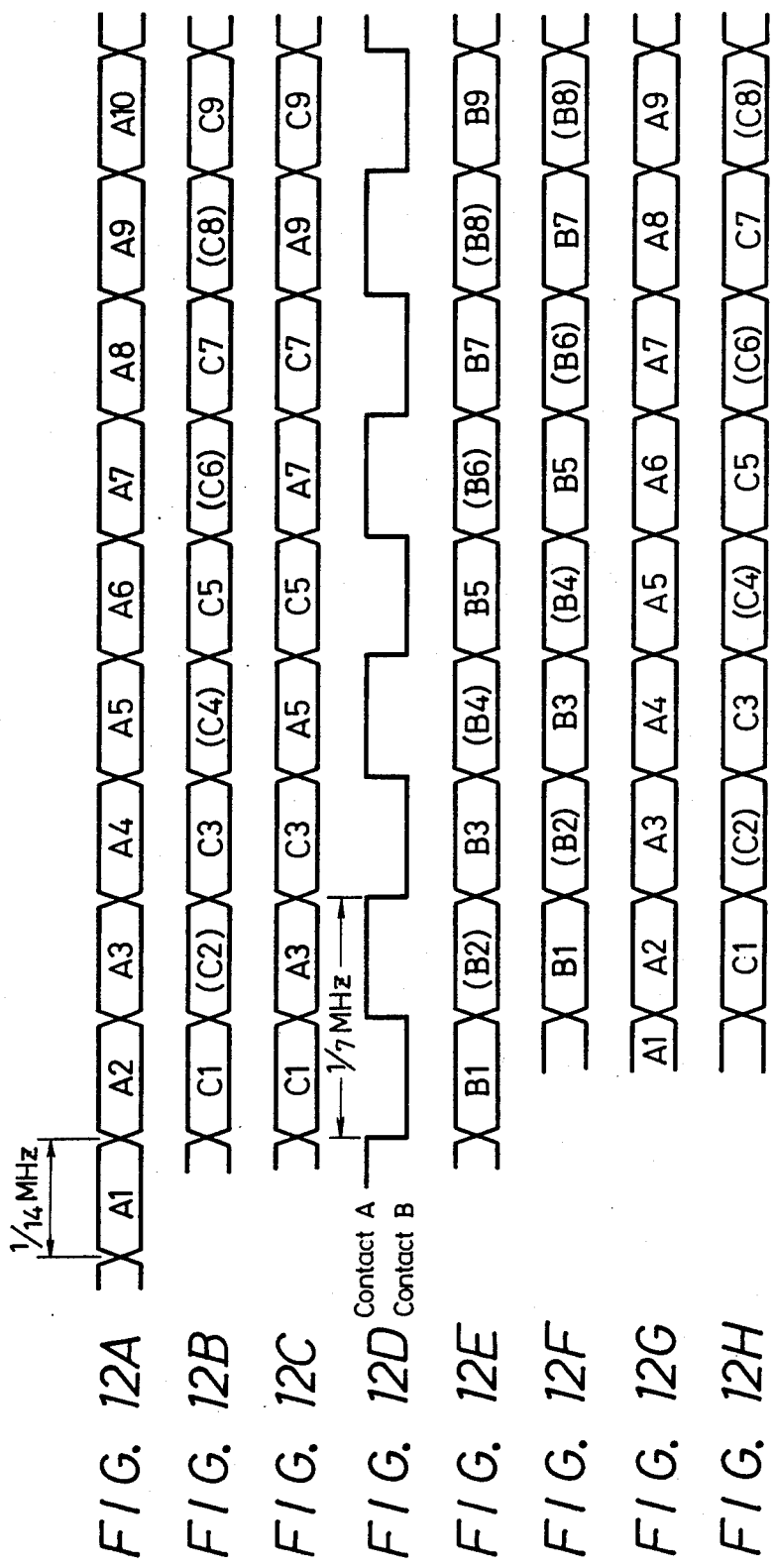

|  | In Case of The Existence of Horizontal Edge | In Case of The Nonexistence of Horizontal Edge |
|---|---|---|
| In Case of The Existence of Vertical Edge | Vth 1 | Vth 1 |
| In Case of The Nonexistence of Vertical Edge | Vth 2 | Vth 3 |

SIGNAL PROCESSING CIRCUIT FOR A MOVING DETECTION CIRCUIT WHICH INCLUDES COEFFICIENT GENERATOR WHEREIN A NUMBER OF DELAY DEVICES ARE CONNECTED IN SERIES WITH THE FIRST ONE RECEIVING THE OUTPUT OF A MOVING DETECTION CIRCUIT AND INCLUDING A TIME BASE FILTER

CROSS-REFERENCES TO RELATED APPLICATIONS

This application is related to application entitled "MOVING DETECTOR CIRCUIT" in which the inventors are H. Motoe, H. Kawashima and M. Tokunara assigned to the assignee of the present application identified as U.S. Ser. No. 07/379,054.

BACKGROUND OF THE INVENTION

1. Field of the Invention

The present invention relates generally to a moving detection circuit and more particularly to a signal processing circuit for use with a moving detection circuit for processing a moving detection signal which is applied to a television receiver such as a so-called improved definition television receiver (IDTV) for providing improved image quality by carrying out a movement-adaptive type scanning line interpolation or the like.

2. Description of the Prior Art

FIG. 1 is a block diagram showing an example of a prior art television receiver.

Referring to FIG. 1, a video signal which is applied to an input terminal 62 is supplied to an analog-to-digital (A/D) converter 63, in which it is converted to a digital video signal. The digital video signal is then fed to a Y/C separating circuit 64, in which it is separated to provide a luminance signal Y and a chrominance signal C. The sampling frequency of the A/D converter 64 is selected to be, for example, 14 MHz.

The luminance signal Y from the Y/C separating circuit 64 is supplied to a scanning line interpolating circuit 65Y. The chrominance signal C from the Y/C separating circuit 64 is supplied to a chroma decoder 66, in which it is decoded to provide a time-division signal of R−Y/B−Y of red and blue color difference signals R−Y and B−Y. The time-division signal R−Y/B−Y from the chroma decoder 66 is supplied to a scanning line interpolating circuit 65C. The scanning line interpolating circuits 65Y and 65C generate interpolating scanning line signals Yc and Rc−Yc/Bc−Yc in addition to the main scanning line signals Ym and Rm−Ym/Bm−Ym simultaneously.

The luminance signal Y from the Y/C separating circuit 64 is supplied to a moving detection circuit 50. The moving detection signal from the moving detection circuit 50 is supplied to a coefficient generator 51. The value K of the multipliers in the scanning line interpolating circuits 65Y and 65C is generated by the coefficient generator 51, and the value K is changed in response to the level of the moving detection signal. For example, K=0 for the still picture portion and the maximum value of K is 1.

The moving detection circuit 50 will be described more fully with reference to FIG. 2.

Referring to FIG. 2, the luminance signal Y from the Y/C separating circuit 64 (see FIG. 1) is supplied to a circuit comprising field memories 401 and 402 connected in series and each form a delay line. The delay time of the series circuit of the field memories 401 and 402 is represented as one frame (263H+262H).

The input signal to the field memory 401 and the output signal from the field memory 402 are supplied to a subtracter 403, in which they are subtracted from each other. The frame difference signal from the subtracter 403 is supplied to a low-pass filter 404, in which the high band noise component and the dot interference component are removed. The thus processed signal from the low-pass filter 404 is supplied to an absolute value circuit 405 in which the signal is converted to an absolute value signal. The output signal from the absolute value circuit 405 is used as the moving detector signal. Japanese Laid-Open Patent No. 55-8124 discloses the above technique in which the movement is detected from the frame difference signal.

The scanning line interpolating circuit 65Y is constructed, for example, as shown in FIG. 3.

Referring to FIG. 3, the luminance signal Y which is delivered from the Y/C separating circuit 64 (see FIG. 1) is supplied to a line memory 601 which forms a delay line which has a delay time of 1H (one horizontal line period). The input and output signals of line memory 601 are supplied to an adder 602, in which they are added and averaged. The output signal from the adder 602 is multiplied by K (K≦1) by a multiplier 603, and is then fed to an adder 604.

The luminance signal Y from the Y/C separating circuit 64 (FIG. 1) is also supplied to a field memory 605 which forms a delay line. The delay time of the field memory 605 is selected to be 263H. The output signal from the field memory 605 is multiplied by 1−K by a multiplier 606, and is then fed to the adder 604.

FIG. 4 shows a scanning line structure from a time-vertical surface standpoint. In FIG. 4, an open circle represents the scanning line of each field. Assuming that h is the above-mentioned input signal, i is the output signal of the line memory 601 and that j is the output signal of the field memory 605, and these signals h to j are arranged to have a positional relationship shown in FIG. 4.

In the scanning line interpolating circuit 65Y, the output signal $(h_2+i)$ of the adder 602 becomes an interpolating scanning line signal representing the real moving picture portion, while the output signal j of the field memory 605 becomes the interpolating scanning line signal representing the still picture portion. The adder 604 generates as a result an interpolating scanning line signal Yc in which the interpolating scanning line signals of the real moving picture and of the still picture portion are added at a ratio corresponding to the amount of movement. The scanning line to be interpolated is located as shown by a broken line circuit in FIG. 4.

The input signal h is directly utilized as the main scanning line signal Ym.

The scanning line interpolating circuit 65C is similarly constructed and therefore need not be described.

Referring back to FIG. 1, the main scanning line signals Ym and Rm−Ym/Bm−Ym and the interpolating scanning line signals Yc and Rc−Yc/Bc−Yc from the scanning line interpolating circuits 65Y and 65C are supplied to timebase-compressing circuits 67Y and 67C, respectively. The timebase-compressing circuits 67Y and 67C time-compress each of the main scanning line signals Ym, Rm−Ym/Bm−Ym and the interpolating scanning line signals Yc, Rc−Yc/Bc−Yc by one half and they are then sequentially delivered at the outputs.

In this case, the timebase-compressing circuit 67C separately generates red and blue color difference signals.

The double-speed luminance signal and color difference signals from the timebase-compressing circuits 67Y and 67C are supplied to digital-to-analog (D/A) converters 68Y, 68R and 68B, in which they are converted to analog signals, respectively.

The double-speed luminance signal and color difference signals from the D/A converters 68Y, 68R and 68B are supplied to a matrix circuit 73. The double-speed red, green and blue signals R, G and B from the matrix circuit 73 are supplied through amplifiers 74R, 74G and 74B to a color cathode ray tube (color CRT) 75, and a color image is displayed on the screen of the color CRT 75 according to the non-interlaced system which has double the usual number of scanning lines.

The moving detection signal from the moving detection circuit 50 shown in the example of FIG. 2 does not correspond to the amount of movement but it corresponds to the difference of signal levels. The coefficient K generated from the coefficient generator 51 corresponds therefore to the level difference and it is not directly related to the amount of movement. For example, with a very small amount of movement, it is frequently observed that the coefficient K is increased (or it is determined that the amount of movement is large).

For example, for the pulse-shaped moving detection signal which is similar to a noise component, the interpolation of the scanning line is carried out with a very large coefficient K, which causes an unnatural-looking picture.

Further, for example, when a portion which has a large luminance signal level difference relative to the background moves, the coefficient K rapidly rises so that the scanning line cannot be smoothly interpolated at the boundary portion between the still picture portion and the real moving picture portion. It is thus frequently observed that the boundary portion looks unnatural.

Furthermore, when the moving detection signal derived from the moving detection circuit 50 shown in FIG. 2 is used, if the edge moves little by little between several fields such as when a seated man is breathing, this edge looks as though it were a noise component so that the image quality is deteriorated.

To remove the above-mentioned disadvantage, it is proposed to expand the moving detection signal in the time direction by using a time base filter.

FIG. 5 illustrates an example of a time base filter which is of a finite impulse response (FIR) type.

Referring to FIG. 5, it will be seen that the moving detection signal from the moving detection circuit 50 is supplied to a series circuit of frame memories $31_1$, $31_2$, . . . each of which form a delay line. The input signal to the frame memory $31_1$ and the output signals from the frame memories $31_1$, $31_2$, . . . are added by an adder 32 and are amplitude-limited by a limiter 33. The moving detection signal, which has been expanded in the time direction and derived from the limiter 33, is supplied to the coefficient generator 51. Alternatively, the frame memories $31_1$, $31_2$, . . . might be formed of field memories.

FIG. 6 also shows an example of a time base filter which is of an infinite impulse response (IIR) type.

Referring to FIG. 6, it will be seen that the moving detection signal from the moving detection circuit 50 is supplied to an adder 41. The output signal from the adder 41 is supplied to a frame memory 42 which forms a delay line. The output signal from the frame memory 42 is supplied through a multiplier 43 to the adder 41, and a cyclic type time base filter is thus formed. The output signal from the frame memory 42 is amplitude-limited by a limiter 44, and the moving detection signal which has been expanded in the time direction and derived from the limiter 44, is fed to the coefficient generator 51.

According to the examples shown in FIGS. 5 and 6, the moving detection signal is expanded in the time direction by using time base filters, so that the above-mentioned deterioration of the image quality can be prevented.

The time base filter shown in the example of FIG. 5 is, however, formed of n bits so that the memory capacity is increased and also, the adder which is used is large-scaled. Thus, the scale of the circuit scale is increased. Further, to increase the time constant, it is necessary to increase the number of frame memories. As a result, it is impossible to provide a long time constant due to the restriction of the capacity of the memory.

In the time base filter shown in the example of FIG. 6, a long time constant can be selected but the bit number must be expanded to carry out the calculation. Thus, the expansion of the bit number leads to an increase of the memory capacity, which provides an increased circuit scale.

FIG. 7 illustrates an example of a prior art television receiver which employs a moving detection circuit, a level comparator, a time base filter, an isolated point eliminating circuit and a coefficient generator. In FIG. 7, like parts corresponding to those of FIG. 7 are marked with the same references and therefore need not be described.

Referring to FIG. 7, it will be seen that the moving detection signal from the moving detection circuit 50 is supplied to a level comparator 52. The level comparator 52 generates a signal of high level "1" when the moving detection signal is higher than a level of a reference level signal Vth and a signal of low level "0" when the moving detection signal is lower than the level of the reference level signal Vth. In other words, the moving detection signal is converted to a one bit signal by the level comparator 52.

The output signal of the level comparator 52 is supplied to the coefficient generator 51 via a time base filter 53 and an isolated-point eliminating circuit 54. The value K of the above-mentioned scanning line interpolating circuits 65Y and 65C is generated by the coefficient generator 51. The time base filter 53 is constructed similarly to the time base filters shown in FIG. 5 and 6.

The isolated-point eliminating circuit 54 is used to eliminate a moving detection signal produced by a jitter component and a noise component of the luminance signal system. The isolated-point eliminating circuit 54 is constructed, as for example, as shown in FIG. 8.

Referring to FIG. 8, the output signal from the time base filter 53 is supplied to a series circuit of D-type flip-flops 541 and 542 which form a delay line. In this case, the delay time of each of the D-type flip-flops 541 and 542 is selected to be one sampling period (1/14 MHz).

The input signal to the D-type flip-flop 541 and the output signals from the D-type flip-flops 541 and 542 are supplied to an AND circuit 543.

With the above-mentioned circuit arrangement, if the moving detection signal is at a high level "1" only during a period of less than two sampling periods, any one of the input signal to the D-type flip-flop 541 and the output signals from the D type flip-flops 541 and 542 go to low level "0" so that the AND circuit 543 produces no output signal. In other words, a portion which goes to high level "1" only during the period of less than two sampling cycles is determined as the isolated point and is thereby eliminated. Thus, the AND circuit 543 generates a moving detection signal in which the isolated-point is eliminated.

In the example shown in FIG. 7, the moving detection signal is converted to a one bit signal by the level comparator 52, in which a noise component of less than a predetermined level is suppressed.

In the prior art, the level of the reference level signal Vth in the level comparator 52 is fixed. If the level of the reference level signal Vth is determined to be a maximal value of a frame difference signal of, for example, a still picture source, then a detection error (the signal of high level "1" is generated as the still picture instead of the signal of low level "0") does not occur for the still picture. The problem is however presented in that the ability to detect movement in the real moving picture mode deteriorates. On the other hand, if the level of the reference level signal Vth is determined to be a level of a frame difference signal which represents, for example, a flat portion of a still picture source, although the ability for detecting the movement in the real moving picture mode is improved, a detection error occurs due to a noise component which is generated in the portion such as an edge portion or the like which has a high frequency component in the still picture mode.

Further, in the example shown in FIG. 7, the isolated-point eliminating circuit 54 is provided as the next stage after the time base filter 53. According to this circuit arrangement, the isolated-point cannot be satisfactorily eliminated which will be hereafter explained more fully.

When moving detection signals of N to N+5 frames have isolated-points P before they are processed by the time base filter 53 such as shown in FIG. 9, after being processed by the time base filter 53, the moving detection signals of N to N+5 frames have isolated-points P each of which is increased in width as shown in FIG. 10. Consequently, the wide isolated-points P cannot be identified as the isolated-points P by the isolated-point eliminating circuit 54 and they are directly delivered as the moving detection signals, thus the portions which are the real moving picture mode and the image quality will be deteriorated.

OBJECTS AND SUMMARY OF THE INVENTION

It is an object of the present invention to provide an improved signal processing circuit for use with a moving detection circuit which can remove the above-mentioned defects encountered with the prior art circuits.

More specifically, it is an object of the present invention to provide a signal processing circuit for a moving detection circuit which can obtain a moving detection signal which has been expanded in the time direction with a memory of small capacity and which uses a reduced bit number for logic calculation.

It is another object of the present invention to provide a signal processing circuit for a moving detection circuit which can interpolate scanning lines satisfactorily, to thus improve the image quality.

It is still another object of the present invention to provide a signal processing circuit for a moving detection circuit which can prevent detection errors.

It is still another object of the present invention to provide a signal processing circuit for a moving detection circuit which can prevent the moving detection ability from being deteriorated during the real moving picture mode.

It is a further object of the present invention to provide a signal processing circuit for a moving detection circuit which can satisfactorily eliminate so-called isolated-point problems.

In accordance with one aspect of the present invention, there is provided a signal processing circuit for a moving detection circuit which comprises a coefficient generator which is connected to an output of a moving detection circuit, characterized by;

The coefficient generator comprises:

(a) a plurality of one bit delay devices which are connected in series, and said plurality of one bit delay devices have a plurality of output terminals; and (b) an adder is connected to said plurality of output terminals so as to add the output signals.

In accordance with other aspects of the present invention, there is provided a signal processing circuit for a moving detection circuit which comprises a coefficient generator which is connected to the output of a moving detection circuit, characterized by:

(1) a level comparator which is connected between said moving detection circuit and said coefficient generator; and (2) threshold voltage switching means which are connected to said level comparator.

In accordance with a further aspect of the present invention, there is provided a signal processing circuit for a moving detection circuit which comprises a coefficient generator which is connected to the output of a moving detection circuit, characterized by:

(A) a level comparator which is connected between said moving detection circuit and said coefficient generator;

(B) an isolated-point eliminating circuit connected between said level comparator and said coefficient generator; and (C) a time base filter connected between said isolated-point eliminating circuit and said coefficient generator.

These and other objects, features and advantages of the present invention will be apparent in the following detailed description of preferred embodiments when read in conjunction with the accompanying drawings, in which like reference numerals identify the same or similar parts in the several views.

BRIEF DESCRIPTION OF THE DRAWINGS

FIG. 7 is a block diagram showing an example of a prior art television receiver having an isolated-point eliminating circuit;

FIG. 8 is a block diagram showing an example of a prior art isolated-point eliminating circuit used in the television receiver shown in FIG. 7;

FIG. 9 is a schematic diagram showing a signal which does not pass through a time base filter of the prior art television receiver which has an isolated-point eliminating circuit;

FIG. 10 is a schematic diagram showing a signal which has already passed through the time base filter of the prior art television receiver which has an isolated-point eliminating circuit;

FIGS. 12A through 12H are, respectively, timing charts used to explain the operation of the time base filter shown in FIG. 11;

FIG. 13 is a schematic diagram used to explain a decoder which is connected to the coefficient generator according to the present invention;

DETAILED DESCRIPTION OF PREFERRED EMBODIMENTS

The present invention will now be described with reference to the drawings.

We will now describe a first embodiment of a signal processing circuit for a moving detection circuit including a time base filter and a coefficient generator according to the present invention.

Figure 11:
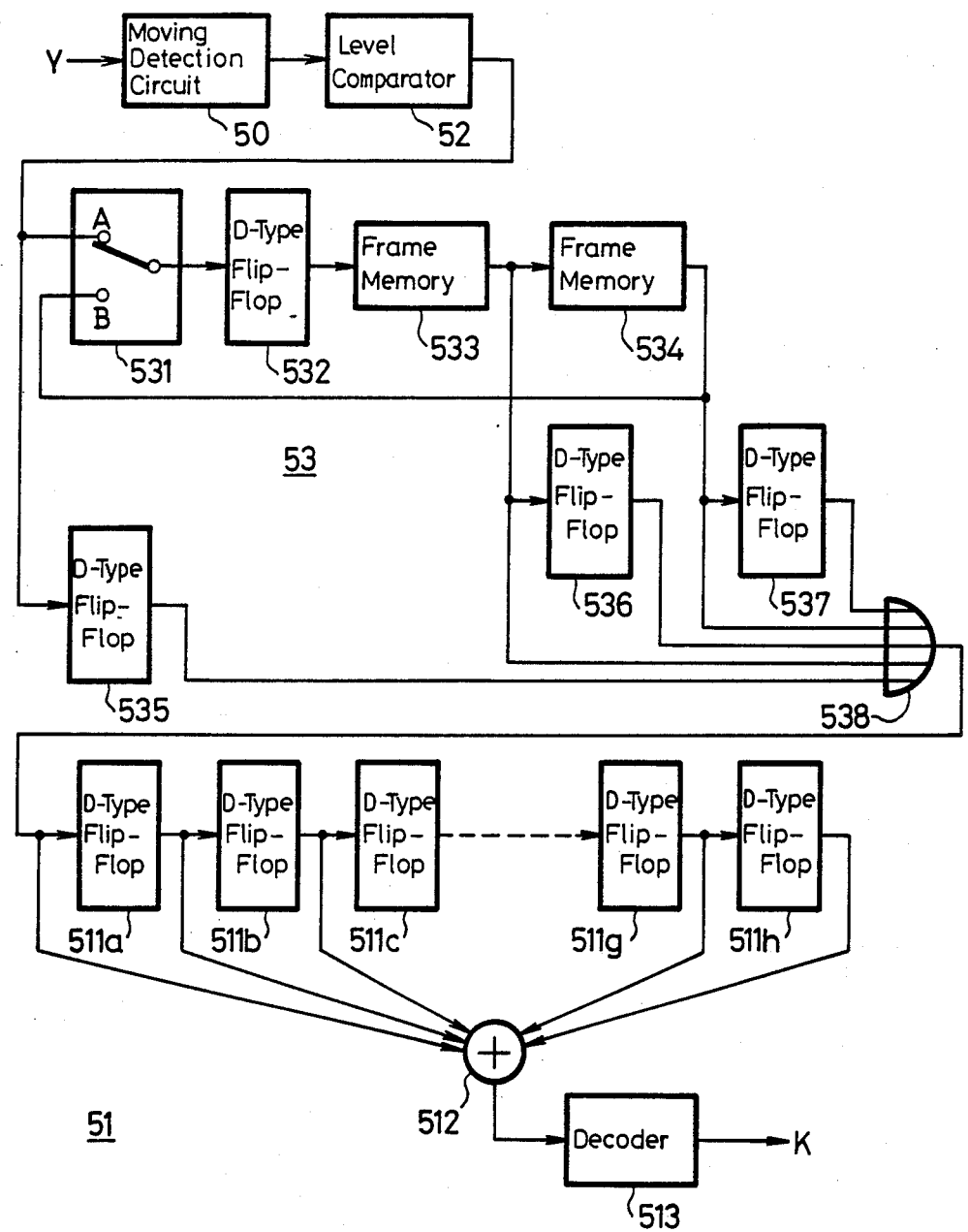
FIG. 11 is a block diagram showing a first embodiment of a signal processing circuit for a moving detection circuit which has a first embodiment of a time base filter and a coefficient generator according to the present invention.

Referring to the drawings in detail and initially to FIG. 11, a moving detection signal from the moving detection circuit 50 is supplied to the level comparator 52. The level comparator 52 generates a signal having a high level "1" when the moving detection signal is higher than the reference level and generates a signal having a low level "0" when the moving detection signal is lower than the reference level. In other words, the moving detection signal is converted to a signal of one bit by the level comparator 52.

The output signal of the level comparator 52 is supplied to a fixed contact A of a change-over switch 531 which forms a time base filter 53. The output signal of the change-over switch 531 is supplied to a series circuit of a D-type flip-flop 532 and frame memories 533 and 534 which form a delay line. In this case, the delay time of the D-type flip-flop 532 is selected to be one sampling period (1/14 MHz). In other words, the total number of samples in the series circuit of the D-type flip-flop 532 and the frame memories 533 and 534 becomes 2 frames plus one sample, and the moving detection signal is delayed by the delay time of 2 frames plus one sample by this series circuit.

The output signal from the frame memory 534 is fed to the fixed contact B of the change-over switch 531. The position of change-over switch 531 is controlled by a signal of 7 MHz which has a duty ratio of 50% which is shown in FIG. 12D so that the moveable contact of the switch 531 is alternately connected to the fixed contacts A and B at every sampling period (1/14 MHz). The change-over switch 531 selectively produces the output signal of the level comparator 52 and alternately the output signal of the frame memory 534 in response to each sample.

The output signal from the level comparator 52 is supplied to an OR circuit 538 through a D-type flip-flop 535 which forms a delay line. The output signal from the frame memory 533 is supplied directly and also through a D-type flip-flop 536 which forms a delay line to the OR circuit 538. The output signal from the frame memory 534 is supplied directly and also through a D-type flip-flop 537 to the OR circuit 538. In this case, the delay time of each of the D-type flip-flops 535 through 537 is selected to be one sampling period (1/14 MHz).

With the above-mentioned circuit arrangement, let it be assumed that the output signal of the level comparator 52 and the output signals of the frame memories 533 and 534 are represented as shown in FIGS. 12A, 12E and 12B, respectively. The output signals of the frame memories 533 and 534 are respectively delayed by the delay time of one frame plus one sample and two frames plus one sample.

The change-over switch 531 is changed in position in response to the signal of 7 MHz shown in FIG. 12D so that the output signal from the change-over switch 531 becomes as shown in FIG. 12C. In this case, the output signal from the change-over switch 531 is delayed by the delay time of two frames plus one sample by the series circuit of the D-type flip-flop 532 and the frame memories 533 and 534 so that the signal which passes through this series circuit twice is delayed by the delay time of 4 frames plus 2 samples and is not caused by the change-over switch 531 to disappear. When the signal, for example, shown in FIG. 12C is passed through the above-mentioned series circuit, the signals C1, C3, C5, . . . are not selected by the change-over switch 531 and hence disappear.

Further, the output signals from the D-type flip-flops 535, 536 and 537 become as shown in FIGS. 12G, 12F and 12H, respectively. In FIGS. 12B, 12E, 12F and 12H, the portions which are in parentheses represent the portions of the signals which are dropped out.

Consequently, the OR circuit 538 calculates the logical sum of the signals in the time direction as shown in FIGS. 12B, 12E, 12F, 12G and 12H, and the OR circuit 538 generates a moving detection signal which is expanded in the time direction.

Referring back to FIG. 11, the moving detection signal from the OR circuit 538 of the time base filter 53 is supplied to the coefficient generator 51. More specifically, the moving detection signal is supplied to a series circuit of D-type flip-flops 511a to 511h each of which form a delay line. Each of the delay times of the D-type flip-flops 511a to 511h is selected to be one sampling period (1/14 MHz).

The input signal to the D-type flip-flop 511a and the output signals from the D-type flip-flops 511a to 511h are added together by an adder 512. The D-type flip-flops 511a to 511h and the adder 512 constitute a so-called integrator, and the output signal of the adder 512 has values from 0 (when all of the input signals are at low level "0") to 9 (when all of the input signals are at high level "1").

The output signal of the adder 512 is supplied to a decoder 513 and the decoder 513 generates the coefficient K. More specifically, when the output signal from the adder 512 is [0], [1, 2], [3, 4], [5, 6] and [7, 8, 9] respectively as shown in FIG. 13 values of 0, $\frac{1}{4}$, $\frac{1}{2}$, $\frac{3}{4}$ and 1, for example, are respectively generated by the decoder 513 as the coefficient K.

According to the above embodiment of the present invention, the moving detection signal from the moving detection circuit 50 is converted to a one bit signal by the level comparator 52 and the time base filter 53 is formed as a one bit processing type. Thus, according to this embodiment, it is possible to obtain the signal which is expanded in the time direction by utilizing a small memory capacity and a reduced bit number for calculation. Further, according to this embodiment, since the coefficient generator 51 is of an integrator type formed of the D-type flip-flops 511a through 511h, the adder 512 and the decoder 513, it is possible to generate a satisfactory coefficient K which corresponds to the amount of movement.

While the coefficient generator 51 in the above-mentioned embodiment uses 8 D-type flip-flops 511a to 511h, the number of D-type flip-flops is not limited to eight but other numbers may be used.

Figures 14, 15:
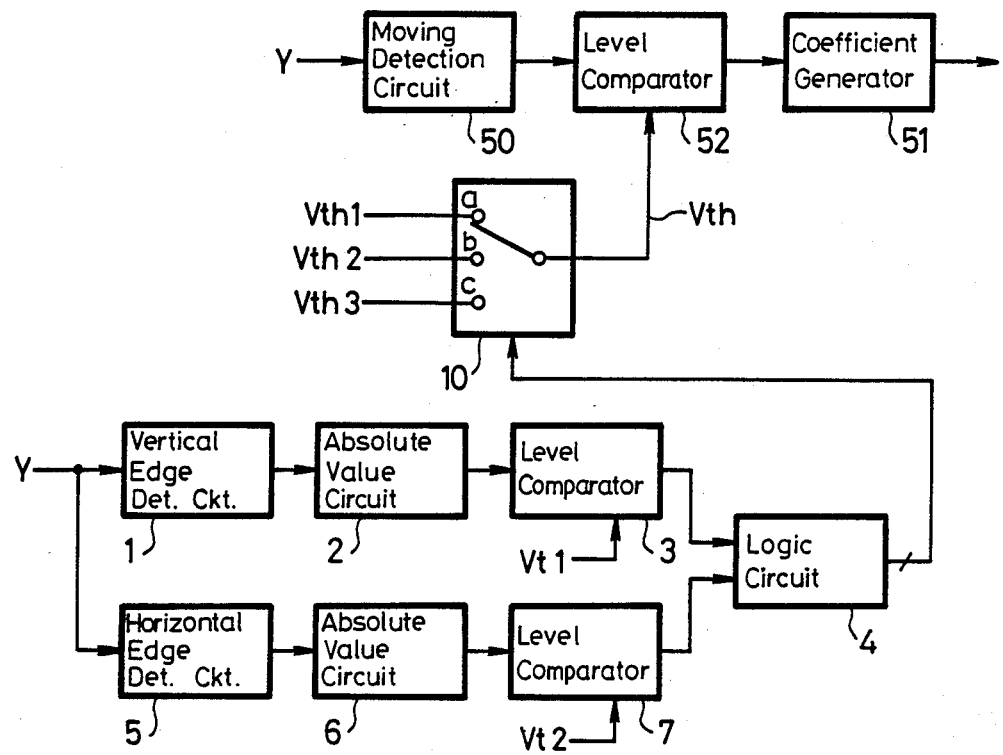
FIG. 14 is a block diagram showing a second embodiment of the signal processing circuit including further level comparators according to the present invention.
FIG. 15 is a schematic representation used to explain the switching operation of a reference level signal of the level comparators shown in FIG. 14.

A second embodiment of the signal processing circuit for a moving detection circuit which includes another embodiment of the level comparator according to the present invention will hereinafter be described with reference to FIG. 14. In FIG. 14, like parts corresponding to those of FIG. 11 are marked with the same references and are not described in detail.

In FIG. 14, reference numeral 10 designates a change-over switch which comprises a level determining means. Voltages Vth1, Vth2 and Vth3 are respectively supplied to fixed contacts a, b and c of the change-over switch 10. The levels of these voltages Vth1, Vth2 and Vth3 are arranged to have a level relationship expressed as Vth1>Vth2>Vth3. The output signal from the change-over switch 10 is supplied to the level comparator 52 as the reference level signal Vth.

Figure 1:
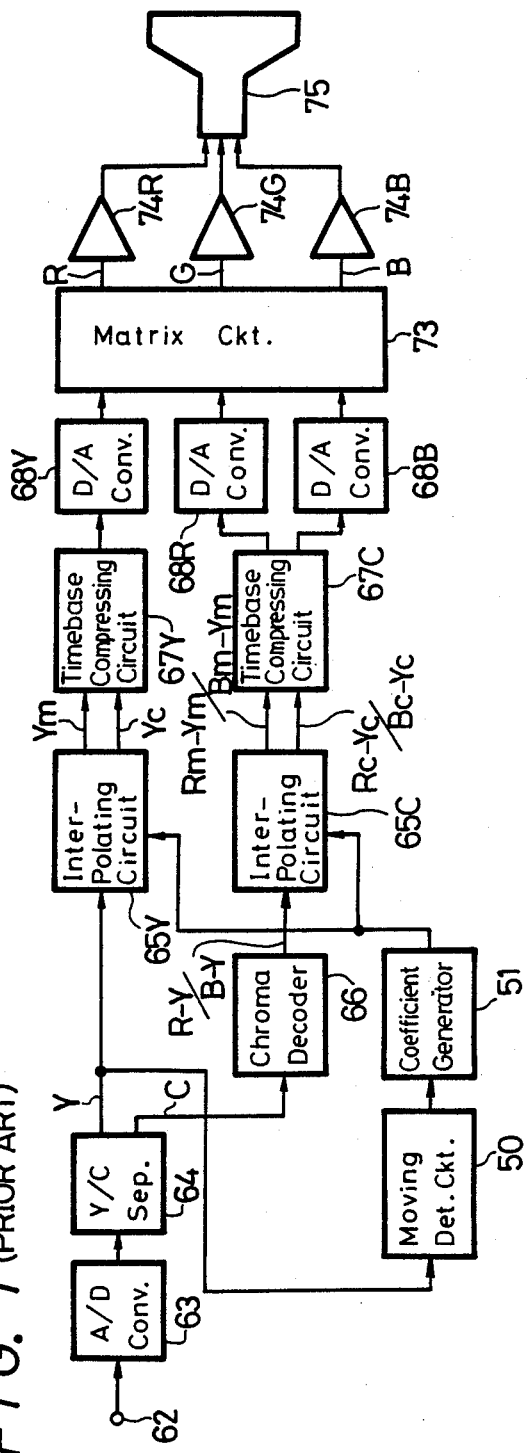
FIG. 1 is a block diagram showing an example of a prior art television receiver having a moving detection circuit.
Figure 3:
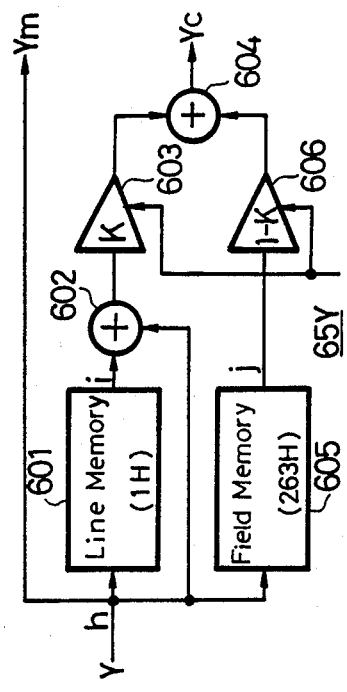
FIG. 3 is a schematic block diagram showing an example of a prior art scanning line interpolating circuit used in the television receiver shown in FIG. 1.
Figure 2:
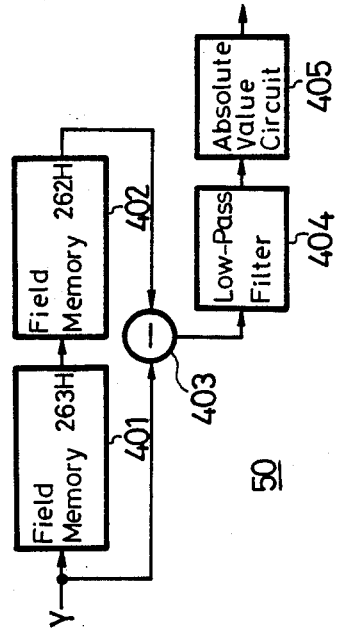
FIG. 2 is a schematic block diagram showing an example of a prior art moving detection circuit used in the television receiver shown in FIG. 1.
Figure 5:
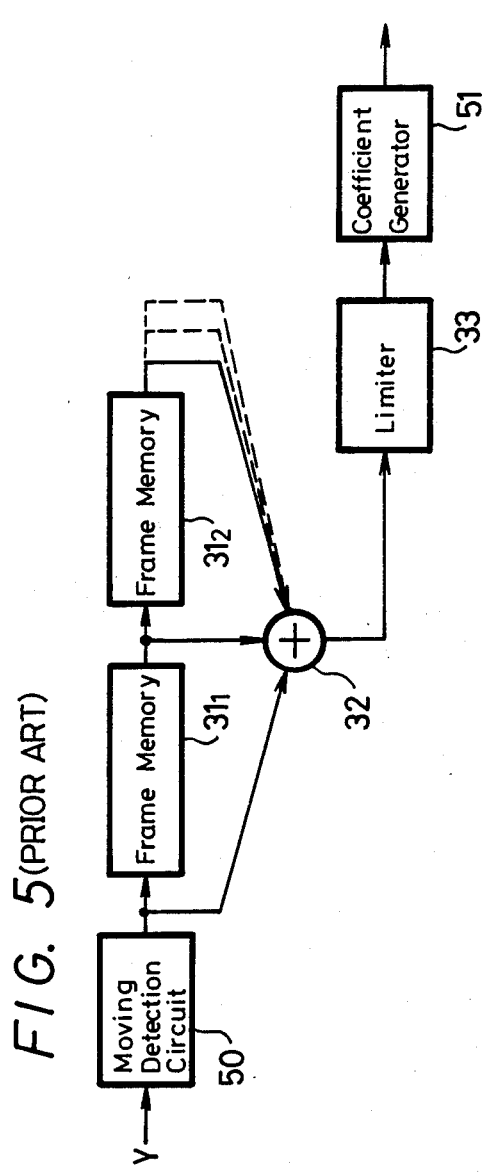
FIG. 5 is a schematic block diagram showing an example of a prior art time base filter formed as a finite impulse response (FIR) type.
Figure 6:
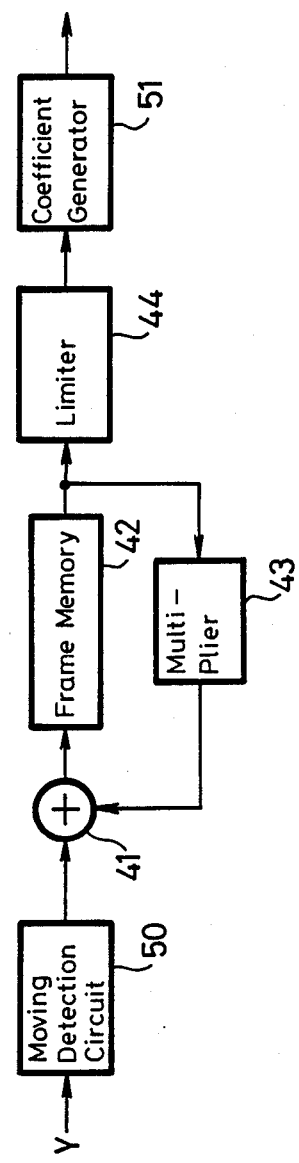
FIG. 6 is a schematic block diagram showing another example of a prior art time base filter formed as an infinite impulse response (IIR) type.
Figure 4:
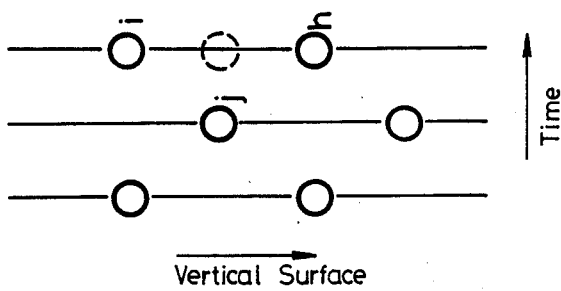
FIG. 4 is a schematic diagram showing a scanning line structure of the prior art scanning line interpolating circuit from a time-vertical surface standpoint.

The luminance signal Y from the Y/C separating circuit 64 (see FIGS. 1 and 7) is supplied to a vertical edge detector 1. The vertical edge detector 1 generates a line difference signal, and this line difference signal is converted to an absolute value by an absolute value circuit 2. The signal from the absolute value circuit 2 is then supplied to a level comparator 3. The level comparator 3 generates a signal of, for example, high level "1" as a vertical edge when the line difference signal supplied thereto is higher than the reference level signal Vt1 and signal of low level "0" when the line difference signal is lower than the reference level signal Vt1.

The luminance signal Y from the Y/C separating circuit 64 is also supplied to a horizontal edge detector 5, which derives a picture element difference signal. The picture element difference signal from the horizontal edge detector 5 is converted to an absolute value by an absolute value circuit 6, and is then fed to a level comparator 7. The level comparator 7 generates a signal of, for example, high level "1" as the horizontal edge when the picture element difference signal supplied thereto is higher than the reference level signal Vt2, and a signal of low level "0" when the picture element difference signal is lower than the reference level signal Vt2.

The output signals from the level comparators 3 and 7 are supplied to a logic circuit 4, in which they are logically calculated. The above-mentioned change-over switch 10 is controlled in position by the output signal from the logic circuit 4. More specifically, the change-over switch 10 is connected to the fixed contact a between the existence of both vertical and horizontal edges or according to the combination of the existence and the nonexistence of vertical and horizontal edges when the output signal of the level comparator 3 goes to high level "1". Further, the change-over switch 10 is connected to the fixed contact b according to the combination of the existence and the nonexistence of the horizontal and vertical edge portions when the output signals of the level comparators 3 and 7 go to low level "0" and high level "1". Furthermore, the change-over switch 10 is connected to the fixed contact c according to the nonexistence of the vertical and horizontal edges when the output signals of the level comparators 3 and 7 go to low level "0".

According to the second embodiment of the present invention, as described above, in case of the existence of both the vertical and horizontal edge portions, the change-over switch 10 is connected to the fixed contact a or b, whereby the reference level signal Vth supplied to the level comparator 52 becomes Vth1 or Vth2 as shown in FIG. 15. Consequently, the reference level is increased and the noise component of a high level produced in the edge portion in the still picture mode can be suppressed. Thus, it is possible to prevent a detection error from occurring.

In case of the existence of the vertical edge portion, the change-over switch 10 is connected to the fixed contact a, whereby the reference level signal Vth becomes Vth1 and the reference level becomes highest. The reason for this is that when the Y/C separating circuit 64, for example, is formed as a comb-filter which utilizes line correlation, the moving detection signal contains a large amount of dot interference components due to the vertical edge and the moving detection signal is easily affected by the dot interference components.

In case of the nonexistence of both vertical and horizontal edges, the change-over switch 10 is connected to the fixed contact c, and the reference level signal supplied to the level comparator 52 becomes Vth3 as shown in FIG. 15. The reference level as a result is lowered so that the ability to detect the real moving picture will not be deteriorated.

While in the above-mentioned second embodiment the level of the reference level signal Vth is switched to the three steps of Vth1 to Vth3, the level of the reference level signal Vth may be switched in many more steps or it may be changed linearly.

While in the above-mentioned embodiment the vertical and horizontal edges are both detected so as to control the reference level, it is possible that one of the vertical and horizontal edges can be detected so as to control the reference level.

Figure 16:
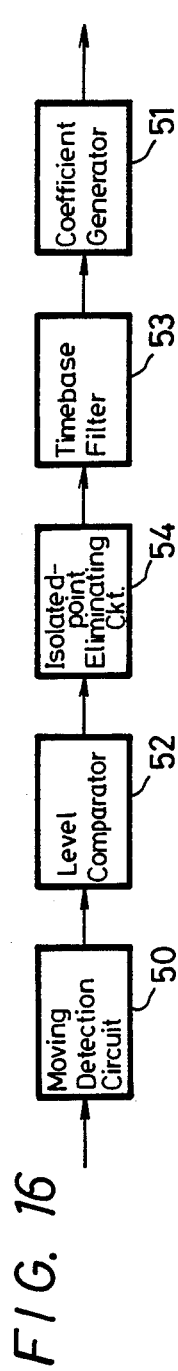
FIG. 16 is a block diagram showing a main portion of a third embodiment of the signal processing circuit for a moving detection circuit which includes an isolated-point eliminating circuit.

A third embodiment of a signal processing circuit for a moving detection circuit, which includes the isolated-point eliminating circuit, according to the present invention will be described with reference to FIG. 16. In FIG. 16, parts which correspond to those in FIG. 7 are marked with the same references and are not described in detail.

In this embodiment, the time base filter 53 is provided at the next stage after the isolated-point eliminating circuit 54. The other elements in FIG. 16 are formed the same as those of FIG. 7.

According to this embodiment shown in FIG. 16, the time base filter 53 is located after the isolated-point eliminating circuit 54 so that even when the moving detection signal from the level comparator 52 contains the isolated-point P, this isolated-point P is eliminated by the isolated point eliminating circuit 54 before the width is increased by the time base filter 53.

Figure 18:
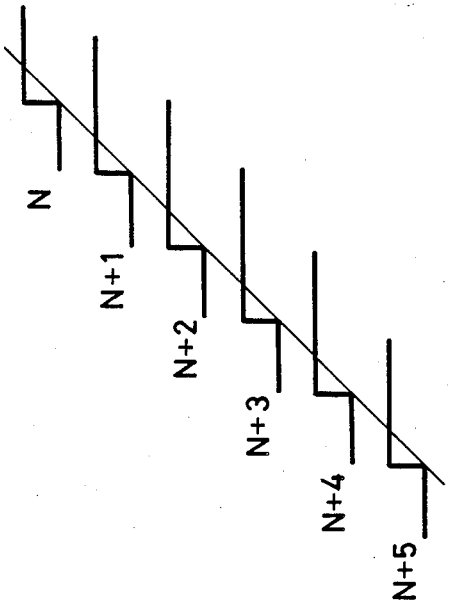
FIG. 18 is a schematic diagram used to explain a signal which already passed through the time base filter in the signal processing circuit shown in FIG. 16.
Figure 17:
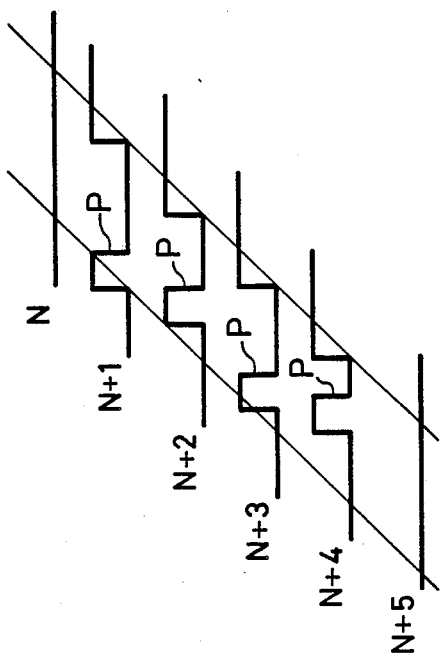
FIG. 17 is a schematic diagram used to explain a signal which does not yet pass through the isolated-point eliminating circuit in the signal processing circuit shown in FIG. 16.

For example, when the moving detection signals of the N to N+5 frames include isolated-points P as shown in FIG. 17 before being processed by the isolated-point eliminating circuit 54, the isolated-points P are eliminated by the isolated point eliminating circuit 54 and are not supplied to the time base filter 53. Thus, the moving detection signals of N to N+5 frames which passed through the time base filter 53, are not affected by the isolated-points P as shown in FIG. 18.

As set out above, according to the third embodiment, isolated-points can be eliminated satisfactorily. Hence, it is possible to prevent the image quality from being deteriorated by the undesired moving detection signal.

According to the present invention, since the moving detection signal from the moving detection means is converted to the one bit signal by the level comparing means and the time base filter is formed as the one bit processing type, it is possible to expand the signal in the time direction with a small memory capacity and with a reduced bit number for logical calculation.

Further, since the moving detection signal from the moving detection means is converted to the one bit signal by the level comparing means and is then supplied to the coefficient generator of the integrator type which generates the coefficient, it is possible to generate a satisfactory coefficient which corresponds to the amount of movement. Thus, the scanning line is interpolated satisfactorily, resulting in the image quality being improved.

Furthermore, according to the present invention, since the reference level is controlled by the vertical edge detecting means or the horizontal edge detecting means so that the reference level is increased, for example, in case of the existence of both vertical and horizontal edges, in the still picture mode, a high level noise component produced at the edge portion can be suppressed, thus elimination detection errors. Furthermore, in case of the nonexistence of both vertical and horizontal edges, the reference level is decreased, which prevents deterioration of the moving detection ability for the real moving picture mode. Therefore, according to the present invention, there is an advantage in that the proper signal conversion which corresponds to the contents of the image can be obtained.

In addition, according to the present invention, since the low-pass filter for expanding the moving detection signal in the time direction is provided at the stage after the isolated-point eliminating circuit, it is possible to satisfactorily eliminate the isolated-points.

It should be understood that the above description is presented by way of example for the preferred embodiments of the invention and it will be apparent that many modifications and variations could be effected by one with ordinary skill in the art without departing from the spirit and scope of the novel concepts of the invention so that the scope of the invention should be determined only by the appended claims.

We claim as our invention:

1. A signal processing circuit for a moving detection circuit comprising, a coefficient generator connected to an output of a moving detection circuit, characterized by said coefficient generator comprising: (a) a plurality of one bit delay devices connected in series with a first one receiving the output of said moving detection circuit, said plurality of one bit delay devices having a plurality of output terminals; (b) an adder connected to said plurality of output terminals so as to add the output signals from said plurality of one bit delay devices, and further comprising a time base filter, said time base filter formed with a first one sampling time delay memory, first and second frame memories connected in series to said output of said first one sampling time delay memory, and switching means connected to said moving detection circuit and to an output of said second frame memory so as to selectively supply signals to the input of said one sampling time delay memory.

2. A signal processing circuit for a moving detection circuit according to claim 1, wherein said first one sampling time delay memory is a D type flip-flop.

3. A signal processing circuit for a moving detection circuit according to claim 1, wherein said time base filter further comprises a second one sampling time delay memory which is connected to an output of said first frame memory, a third one sampling time delay memory connected to the output of said second frame memory, a fourth one sampling time delay memory connected to said moving detection circuit, and an OR gate connected to the outputs of said second, third and fourth one sampling time delay memories.

4. A signal processing circuit for a moving detection circuit according to claim 3, wherein said second, third and fourth one sampling time delay memories are D type flip-flops, respectively.

5. A signal processing circuit for a moving detection circuit comprising a coefficient generator connected to an output of a moving detection circuit, including (1) a level comparator connected between said moving detection circuit and said coefficient generator; (2) threshold voltage switching means with its output is connected to said level comparator, and, further comprising vertical edge detection means which receives a luminance signal, a vertical absolute value means connected to the output of said vertical edge detection means, a vertical level comparator connected to the output of said vertical absolute value means, and means for controlling said threshold voltage switching means connected to receive the output of said vertical level comparator.

6. A signal processing circuit for a moving detection circuit comprising a coefficient generator connected to an output of a moving detection circuit, including (1) a level comparator connected between said moving detection circuit and said coefficient generator; (2) threshold voltage switching means with its output is connected to said level comparator, and, further comprising horizontal edge detection means which receives a luminance signal, a horizontal absolute value means connected to the output of said horizontal edge detection means, a horizontal level comparator connected to receive the output of said horizontal absolute value means, and means for controlling said threshold voltage switching means connected to receive the output of said horizontal level comparator.

7. A signal processing circuit for a moving detection circuit comprising a coefficient generator connected to an output of a moving detection circuit, including (1) a level comparator connected between said moving detection circuit and said coefficient generator; (2) threshold voltage switching means with its output is connected to said level comparator, and, further comprising a vertical edge detection means which receives a luminance signal, a horizontal edge detection means supplied with a luminance signal, a vertical absolute value means connected to receive the output of said vertical edge detection means, a horizontal absolute value means connected to receive the output of said horizontal edge detection means, a vertical level comparator connected to receive the output of said vertical absolute value means, a horizontal level comparator connected to receive the output of said horizontal absolute value means, and a logic circuit connected to receive the outputs of said vertical level comparator and said horizontal level comparator and producing an output for controlling the threshold voltage of said switching means.

8. A signal processing circuit for a moving detection circuit according to claim 7, wherein said logic circuit is responsive to the vertical edge and the horizontal edge, respectively, and said threshold voltage switching means supplies different voltages for the conditions when both vertical and horizontal edges occur and when neither one of of the vertical and horizontal edges occur.

9. A signal processing circuit for a moving detection circuit according to claim 7, wherein said logic circuit is responsive to vertical edges and horizontal edges, respectively, so that said threshold voltage switching means supplies three different voltages which depend upon the combination of the existence and the nonexistence of vertical and horizontal edges.

10. A signal processing circuit for a moving detection circuit according to claim 9, wherein said three different voltages are high in the case when both vertical and horizontal edges occur and low in the case when neither one of said vertical and horizontal edges occur.

11. A signal processing circuit for a moving detection circuit comprising a coefficient generator connected to an output of a moving detection circuit, characterized by: (A) a level comparator which is connected between said moving detection circuit and said coefficient generator; (B) an isolated-point eliminating circuit connected between said level comparator and said coefficient generator; (C) a time base filter connected between said isolated-point eliminating circuit and said coefficient generator, and, wherein said isolated-point eliminating circuit comprises a pair of series connected one sampling time delay memories, and an AND circuit which is supplied with signals from input and output terminals of said pair of one sampling time delay memories.

* * * * *